US 9,969,927 B2

(12) United States Patent
Dobson, Jr. et al.

(10) Patent No.: US 9,969,927 B2
(45) Date of Patent: May 15, 2018

(54) TREATMENT FLUIDS WITH NON-OXIDIZER CLASS INORGANIC PEROXIDE POLYMER BREAKERS AND METHODS OF USE THEREOF

(71) Applicant: TUCC Technology, LLC, Houston, TX (US)

(72) Inventors: James W. Dobson, Jr., Houston, TX (US); Shauna L. Hayden, Houston, TX (US); Kim O. Tresco, Houston, TX (US)

(73) Assignee: TUCC Technology, LLC, Houston, TX (US)

( * ) Notice: Subject to any disclaimer, the term of this patent is extended or adjusted under 35 U.S.C. 154(b) by 94 days.

(21) Appl. No.: 14/286,967

(22) Filed: May 23, 2014

(65) Prior Publication Data

US 2014/0349897 A1    Nov. 27, 2014

Related U.S. Application Data

(60) Provisional application No. 61/827,064, filed on May 24, 2013.

(51) Int. Cl.
*C09K 8/588* (2006.01)
*C09K 8/504* (2006.01)
(Continued)

(52) U.S. Cl.
CPC .......... *C09K 8/588* (2013.01); *C09K 8/035* (2013.01); *C09K 8/5045* (2013.01);
(Continued)

(58) Field of Classification Search
None
See application file for complete search history.

(56) References Cited

U.S. PATENT DOCUMENTS 4,704,404 A * 11/1987 Sanderson ............ A01N 41/04
                                                          252/186.23
5,447,199 A    9/1995 Dawson et al.
(Continued)

FOREIGN PATENT DOCUMENTS

WO    2009/114611 A2    9/2009
WO    2010/140033 A2    12/2010

OTHER PUBLICATIONS

International Search Report and Written Opinion of PCT Application No. PCT/US2014/039461 dated Oct. 8, 2014: pp. 1-9.
(Continued)

*Primary Examiner* — Jeffrey Washville
(74) *Attorney, Agent, or Firm* — Lewis, Reese & Nesmith, PLLC

(57) ABSTRACT

A treatment fluid composition for treating a subterranean formation penetrated by a well bore is formed from an aqueous fluid, a hydratable polymer and an inorganic peroxide breaking agent, which is classified as a stable, non-oxidizer according to UN standards but which retains oxidizing properties as measured by the content of available oxygen. A method of treating a subterranean formation penetrated by a well bore may also be performed by forming a treatment fluid from an aqueous hydrated polymer solution. This is combined with a stable, inorganic peroxide breaking agent. The treating fluid is then introduced into the formation. An optional crosslinking agent capable of crosslinking the polymer may also be included.

7 Claims, 1 Drawing Sheet

(51) Int. Cl.

| | |
|---|---|
| *C09K 8/508* | (2006.01) |
| *C09K 8/512* | (2006.01) |
| *C09K 8/514* | (2006.01) |
| *C09K 8/66* | (2006.01) |
| *C09K 8/68* | (2006.01) |
| *C09K 8/84* | (2006.01) |
| *C09K 8/88* | (2006.01) |
| *C09K 8/90* | (2006.01) |
| *C09K 8/035* | (2006.01) |

(52) U.S. Cl.
CPC ............ *C09K 8/5083* (2013.01); *C09K 8/512* (2013.01); *C09K 8/514* (2013.01); *C09K 8/665* (2013.01); *C09K 8/68* (2013.01); *C09K 8/685* (2013.01); *C09K 8/845* (2013.01); *C09K 8/882* (2013.01); *C09K 8/887* (2013.01); *C09K 8/90* (2013.01); *C09K 2208/26* (2013.01)

(56) References Cited

U.S. PATENT DOCUMENTS

| | | |
|---|---|---|
| 5,783,527 A | 7/1998 | Dobson, Jr. et al. |
| 7,833,949 B2 | 11/2010 | Li et al. |
| 8,361,936 B2 | 1/2013 | Mukhopadhyay et al. |
| 2009/0221453 A1 | 9/2009 | Mukhopadhyay et al. |
| 2010/0048429 A1* | 2/2010 | Dobson, Jr. ............. E21B 43/25 507/212 |
| 2011/0042078 A1* | 2/2011 | Chapman ............... C09K 8/032 166/252.5 |

OTHER PUBLICATIONS

Solvay, S. A., "Magnesium Peroxide Standard Sales Specification Characteristics of the Product Content Unit Value Methods of Analysis," Solvay Chemicals International, 2 pages, issued on Nov. 9, 2013, retrieved on Dec. 12, 2016, retrieved from <http://www.solvay.com/en/binaries/PDS_IXPER_35M-187904.pdf>.

* cited by examiner

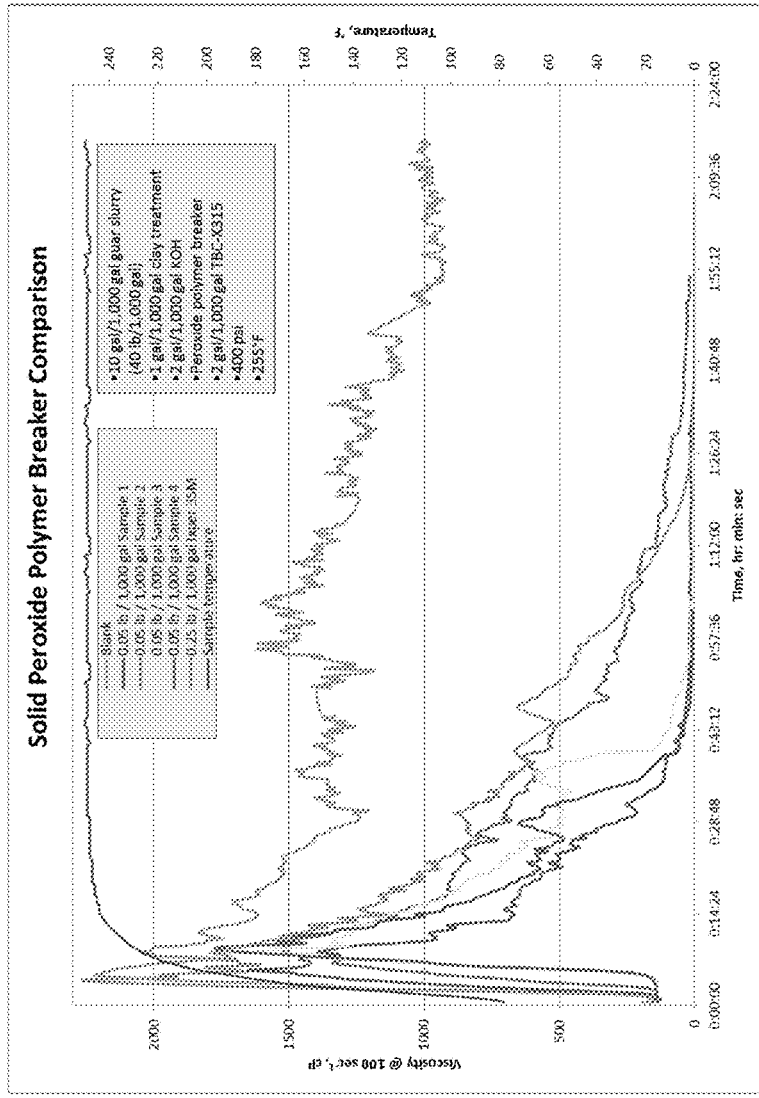

TREATMENT FLUIDS WITH NON-OXIDIZER CLASS INORGANIC PEROXIDE POLYMER BREAKERS AND METHODS OF USE THEREOF

CROSS-REFERENCE TO RELATED APPLICATION

This application claims priority to U.S. Provisional Application No. 61/827,064, filed May 24, 2013, which is herein incorporated by reference in its entirety.

BACKGROUND

The inventions disclosed and taught herein relate generally to treatment fluids for use in treating subterranean zones and formations penetrated by well bores. In particular, the inventions relate to viscosified treatment fluids and compositions containing a stabilized breaker, and methods for using such fluids.

Carbohydrate polymers, crosslinked with various ions, such as boron, zirconium, and titanium, are used as high-viscosity fracturing fluids in the oil and gas industry. Polysaccharides, such as guar and guar derivatives, are commonly used as viscosifying water-based fluids for fracturing treatments and for proppant transport. The proppant remains in the produced fracture in order to keep the fracture open and create a conductive channel extending from the well bore into the formation along the fracture length. After the fracture is complete, the recovery of the fracturing fluid is crucial to accelerate hydrocarbon production through the formed channel.

The recovery of the fracturing fluid is achieved by reducing the viscosity of the fluid such that the fluid flows naturally through the proppant pack. Chemical reagents, such as oxidizers, acids and enzymes are typically employed to break the polymer networks to reduce their viscosity. These materials are commonly referred to as breakers.

The timing of the break is critical. Gels broken prematurely can cause proppant to settle out of the fluid before reaching a sufficient distance into the produced fracture and result in a premature screen-out. Premature breaking can also result in less desirable fracture width in the created fracture. On the other hand, too much delay in breaking the gel is not desirable either. Delayed breaking can cause significant reduction in the hydrocarbon production. These factors, including breaker reactivity level versus temperature, delay mechanisms, and insufficient clean-up of the proppant pack impose significant complexity in designing a successful breaker system.

Ammonium persulfate (APS), is one of the most widely used breakers in the industry. When APS is used, free sulfate radicals are generated due to thermal decomposition of the persulfate ions upon homolytic cleavage of the peroxo (O—O) bond. This free radical initiates a chain scission process by interacting with the polymer chain to abstract hydrogen, which results in the primary bond cleavage of either the mannose or galactose groups. The generated radicals propagate the process, further breaking the polymer into lower molecular weight fragments. This continues until the termination of the reaction occurs, mostly due to the combination of two radicals.

Although the use of APS breaker systems is widely accepted, the use of this type of breaker suffers from several drawbacks, including slow break times at temperatures below about 120° F., and fast break times for temperatures greater than 120° F. Consequently, other options have been used, including enzymatic breakers and peroxide breaker systems. The first of these, while often effective, can be expensive to use and are sometimes inefficient in a typical well treatment situation. The peroxide breaker systems, while both effective and cost efficient, have the inherent drawback of being classified as "oxidizers", thus increasing costs in transport, and storage, and raising concerns of long term stability.

The inventions disclosed and taught herein are directed to well treatment compositions that include calcium peroxide ($CaO_2$) particles which are manufactured so as to be classified as a non-oxidizer under standard testing methods, while maintaining oxidizing properties, including available oxygen content, suitable for their use as polymer breaking agents in hydrocarbon recovery operations.

For the purposes of the instant invention, the term "particles" means a powder or granule or multi-layer tablet (etc.) made of free particles, preferably with a low moisture content (typically below about 1%).

BRIEF SUMMARY OF THE INVENTION

The objects described above and other advantages and features of the invention are incorporated in the application as set forth herein, and the associated drawings, related to systems for compositions for use in the treatment of subterranean zones, the compositions including inorganic peroxide particles which are classified as a non-oxidizer under standard test methods, but which have retained their oxidizing properties, particularly an available oxygen content of at least about 4.0% by weight.

BRIEF DESCRIPTION OF THE DRAWINGS

For a more detailed description of the embodiments, reference will now be made to the following accompanying drawings:

FIG. 1 shows a plot of the viscosity reduction over time of gelled polymer solutions containing non-oxidizer class calcium and magnesium peroxide polymer breakers heated to approximately 255° F. at 400 psi.

While the inventions disclosed herein are susceptible to various modifications and alternative forms, only a few specific embodiments have been shown by way of example in the drawing and are described in detail below. The Figure and detailed descriptions of these specific embodiments are not intended to limit the breadth or scope of the inventive concepts or the appended claims in any manner. Rather, the Figure and detailed written descriptions are provided to illustrate the inventive concepts to a person of ordinary skill in the art and to enable such person to make and use the inventive concepts.

DETAILED DESCRIPTION

The Figure described above and the written description of specific structures and functions below are not presented to limit the scope of what Applicants have invented or the scope of the appended claims. Rather, the Figure and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and timing. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items; that is, the singular forms "a", "an" and "the" include plural references unless the content clearly dictates otherwise. Thus, for example, reference to "a salt" can include a mixture of two or more such agents, and the like. Also, the use of relational terms, such as, but not limited to, "top," "bottom," "left," "right," "upper," "lower," "down," "up," "side," and the like are used in the written description for clarity in specific reference to the Figure and are not intended to limit the scope of the invention or the appended claims.

It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, a range of "from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

The term "suspension" or "fluidized suspension," as used herein, refers to a mixture containing a substantially uniform mixture or distribution of solute and particulate matter throughout the liquid carrier; or a mixture containing a solid as a dispersed phase in a liquid phase.

Applicants have created well treatment compositions for use in hydrocarbon recovery operations that include inorganic peroxide particles as "breakers" or "breaking agents," wherein the inorganic peroxide particles, such as calcium peroxide, are classified as non-oxidizers according to the standard testing methods for oxidizing solids. In particular, the inorganic peroxide particles used in the compositions and methods of Applicants' invention are classified as non-oxidizers according specifically to the standard testing method for oxidizing solids of the UN Manual on Tests and Criteria for the Transport of Dangerous Goods, 5$^{th}$ Revised Edition, sub-section 34.4.1, while maintaining oxidizing properties; e.g., the inorganic peroxides exhibit an available oxygen content of at least about 4% by weight.

Embodiments of the invention provide well treatment fluid compositions and methods of using the fluid compositions to treat subterranean formations. The well treatment fluid compositions can be used in hydraulic fracturing, gravel packing operations, water blocking, temporary plugs for purposes of well bore isolation and/or fluid loss control and other well completion operations. The well treatment fluids described within this disclosure are aqueous, whereas non-aqueous fluids are typically formulated and used for these purposes in the industry, and are becoming increasingly undesirable due to global environmental regulations.

The well treatment fluid compositions within the inclusion of the present disclosure, comprise a solvent (preferably water or other suitable aqueous fluid), a hydratable polymer, a crosslinking agent, and one or more inorganic peroxides breakers, particularly an inorganic peroxide breaker (such as $CaO_2$) that are classified as non-oxidizers according specifically to the standard testing method for oxidizing solids of the UN Manual on Tests and Criteria for the Transport of Dangerous Goods. Such inorganic peroxide breakers suitable for use herein, while being classified as non-oxidizers under transportation standards, retain and exhibit oxidizing properties, particularly a content of available oxygen (abbreviated "AvOx") of at least about 4.0% by weight. The inorganic peroxide breakers may be encapsulated or provided with a coating to delay release into the treatment fluid. Non-limiting examples of materials and methods that may be used for encapsulation are described in, e.g., U.S. Pat. No. 6,357,527, which is herein incorporated by reference.

Optionally, the well treatment fluid compositions of the present disclosure may further include various other fluid additives, including but not limited to, friction reducers, surfactants, emulsifiers, temperature stabilizers, pH buffers, biocides, fluid loss control additives, and oxygen control additives, singly or in combination. The well treatment fluid composition may also contain one or more salts, such as potassium chloride, magnesium chloride, sodium chloride, calcium chloride, tetramethyl ammonium chloride, and mixtures thereof, thereby classifying the well treatment fluid as including a "brine."

The water utilized as a solvent or base fluid for preparing the well treatment fluid compositions described herein can be fresh water, unsaturated salt water including brines and seawater, and saturated salt water, and are referred to generally herein as "aqueous-based fluids" or "aqueous fluids." The aqueous-based fluids of the well treatment fluids of the present invention generally comprise fresh water, salt water, sea water, a brine (e.g., a saturated salt water or formation brine), or a combination thereof. Other water sources may be used, including those comprising monovalent, divalent, or trivalent cations (e.g., magnesium, calcium, zinc, or iron) and, where used, may be of any weight.

In certain exemplary embodiments of the present inventions, the aqueous, based fluid may comprise fresh water or salt water depending upon the particular density of the composition required. The term "salt water" as used herein may include unsaturated salt water or saturated salt water "brine systems" that are made up of at least one water-soluble salt of a multivalent metal, including single salt systems such as a NaCl, NaBr, $MgCl_2$, KBr, or KCl brines, as well as heavy brines (brines having a density from about 8 lb/gal to about 20 lb/gal, including but not limited to single-salt systems, such as brines comprising water and $CaCl_2$, $CaBr_2$, zinc salts including, but not limited to, zinc chloride, zinc bromide, zinc iodide, zinc sulfate, and mixtures thereof, with zinc chloride and zinc bromide being preferred due to lower cost and ready availability; and, multiple salt systems, such as $NaCl/CaCl_2$ brines, $CaCl_2/CaBr_2$ brines, $CaBr_2/ZnBr_2$ brines, and $CaCl_2/CaBr_2/ZnBr_2$ brines. If heavy brines are used, such heavy brines will preferably have densities ranging from about 12 lb/gal to about 19.5 lb/gal (inclusive), and more preferably, such a heavy brine will have a density ranging from about 16 lb/gal to about 19.5 lb/gal, inclusive.

The brine systems suitable for use herein may comprise from about 1% to about 75% by weight of one or more appropriate salts, including about 3 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, and about 75 wt. % salt, without limitation, as well as concentrations falling between any two of these values, such as from about 21 wt. % to about 66 wt. % salt, inclusive. Generally speaking, the aqueous-based fluid used in the treatment fluids described herein will be present in the well treatment fluid in an amount in the range of from about 2% to about 99.5% by weight. In other exemplary embodiments, the base fluid may be present in the well treatment fluid in an amount in the range of from about 70% to about 99% by weight. Depending upon the desired viscosity of the treatment fluid, more or less of the base fluid may be included, as appropriate. One of ordinary skill in the art, with the benefit of this disclosure, will recognize an appropriate base fluid and the appropriate amount to use for a chosen application.

A primary factor of the present invention is related to calcium peroxide particles being classified as a non-oxidizer according to the standard testing method for oxidizing solids of the UN Manual on Tests and Criteria for the Transport of Dangerous Goods. Calcium peroxide ($CaO_2$) and magnesium peroxide ($MgO_2$) are well known for their oxidizing properties, and are used in multiple manufacturing processes and product formulations.

In many of these applications, $MgO_2$ can offer the advantage of not being classified as an oxidizer and hazardous for transport. This is not the case for many commercial formulations of $CaO_2$, which are generally classified as an oxidizer (Class 5—Oxidizing Substances/Division 5.1) according to the above mentioned test method of the UN Manual, and subject to the U.S. Department of Transportation regulations applicable to transportation of hazardous chemicals. On the other hand, commercial grades of $CaO_2$ are generally less expensive than their $MgO_2$ equivalents (in terms of oxidizing power) namely because the manufacturing processes of the raw materials are typically less costly. The present invention uses new $CaO_2$ particles that have reduced packaging, labeling, handling, storage, and transportation restrictions under the applicable governmental regulations. The calcium peroxide ($CaO_2$) particles used in the present invention are classified as non-oxidizers according to the UN Manual of Tests and Criteria for the Transport of Dangerous Goods.

The aim of the present invention is to provide inorganic peroxide particles, particularly $CaO_2$ particles, in hydrocarbon recovery and treatment compositions, wherein the $CaO_2$ particles exhibit reduced packaging, handling, storage, and/or transportation constraints versus those generally associated with such known oxidizing products, while simultaneously maintaining the oxidizing ability of the particles.

The inorganic peroxide particles suitable for use as breakers within the compositions of the present invention are preferably $CaO_2$ particles containing $CaO_2$ and at least one other constituent, the amount and nature of the constituent(s) other than $CaO_2$ in the particles being such that the decomposing $CaO_2$ enhances any combustion by related oxygen release, preferably water as a burn rate modifier of combustibles in mixture with oxidizer, and generates an amount appropriate to absorb, at least partially, the heat release of the combustion, or, in other words impacts the burning rate of accelerating combustions in a lasting manner, so that the particles are classified as a non-oxidizer.

Within the frame of the invention, although the inorganic peroxide particles are classified as non-oxidizers from a hazardous point of view, they nevertheless have oxidizing properties and namely, a content of available oxygen (AvOx) of at least 4.0% by weight, more preferably of at least 5.0% by weight and even more preferably, of at least 6.0% by weight, as required or desired for their intended use. Generally however, this content is lower than 11.0% by weight, even lower than 10.5% by weight and more preferably, lower than 10.0% by weight. This content can be adapted by controlling the amount of the non-$CaO_2$ constituent(s) but its maximum value depends on the nature thereof. The content of available oxygen can be measured by titration with potassium permanganate after dissolution in sulfuric acid (see, ISO standard 1917-1982). Chemical stability of the compositions herein may be evaluated by measuring the concentration of AvOx at given storage time after having manufactured the compositions. The concentration of available oxygen can be measured by chemical titration methods known in the art, such as the iodimetric method, thiosulphatimetric method, the permanganometric method and the cerimetric method. Said methods and the criteria for the choice of the appropriate method are described for example in "Hydrogen Peroxide," W. C. Schumb, C. N. Satterfield and R. L. Wentworth, Reinhold Publishing Corporation, New York, 1955 and "Organic Peroxides," Daniel Swern, Editor Wiley Int. Science, 1970.

The hydratable polymers useful in the present invention may include any hydratable polymers familiar to those in the well service industry that are water-soluble. Examples of suitable hydratable polymers include, but are not necessarily limited to, guar gums, high-molecular weight polysaccharides composed of mannose and galactose sugars, or guar derivatives such as hydropropyl guar (HPG), carboxymethyl guar (CMG), and carboxymethylhydroxypropyl guar (CM-HPG), galactomannan gums, glucomannan gums, guars, derived guars and cellulose derivatives. Cellulose derivatives such as hydroxyethylcellulose (HEC), carboxymethylcellulose (CMC), hydroxypropylcellulose (HPC) and carboxymethylhydroxyethylcellulose (CMHEC) may also be used. Also, synthetic polymers containing acrylamide are useful, including polyacrylamides, partially hydrolyzed polyacrylamides, copolymers of acrylamide and acrylic acid and copolymers and terpolymers containing acrylamide, vinyl pyrollidone, AMPS (2-Acrylamido-2-Methyl Propane Sulfonic Acid, or acrylic acid. The viscosifying agent may be heteropolysaccharide viscosifying agent. Heteropolysaccharides such as xanthan gum and those disclosed in U.S. Patent Publication No. US2006/0166836, which is herein incorporated by reference, may be used. In particular, heteropolysaccharides having a tetrasaccharide repeating unit in the polymer backbone may be used.

The hydratable polymer may be added in various concentrations to provide the desired viscosity. Concentrations of up to about 1% by weight of total weight of the treatment composition may be used. In certain embodiments of the invention the hydratable polymer may be used in an amount of from about 0.05% to about 0.5% by total weight of the composition.

The polymers may be capable of being crosslinked with any suitable crosslinking agent, such as metal ion crosslinking agents, provided that such crosslinking agents exhibit at least some solubility in an aqueous solution. For example, the crosslinking agents suitable for use with the compositions of the present disclosure may be sparingly-soluble, slightly-soluble, partially-soluble, or fully-soluble in an aqueous fluid. Examples of such materials include the polyvalent metal ions of boron, aluminum, antimony, zirconium, titanium, and the like that react with the hydratable polymers to form a composition with adequate and targeted viscosity properties for particular operations. The crosslinking agent utilized in the treating fluids described herein is preferably selected from the group consisting of boron compounds such as, for example, boric acid, disodium octaborate tetrahydrate, sodium diborate and pentaborates, and naturally occurring compounds that can provide boron ions for crosslinking, such as ulexite and colemanite; compounds which can supply zirconium IV ions such as, for example, zirconium lactate, zirconium lactate triethanolamine, zirconium carbonate, zirconium acetylacetonate and zirconium diisopropylamine lactate; compounds that can supply titanium IV ions such as, for example, titanium ammonium lactate, titanium triethanolamine, titanium acetylacetonate; compounds that can supply aluminum ions such as, for example, aluminum lactate or aluminum citrate; or, compounds that can supply antimony ions. Of these, a borate compound, particularly a sparingly-soluble borate, is the most preferred. The crosslinking agent utilized is included in the treating fluids described herein in an amount in the range of from about 200 ppm to about 4,000 ppm, inclusive.

The crosslinking agent may be added in an amount that results in suitable viscosity and stability of the gel at the temperature of use. The crosslinking agent is preferably added as a solution and may include a ligand or other additive that acts to delay the crosslinking reaction. This delay may be beneficial in that the high viscosity fracturing fluid is not formed until near the bottom of the well bore to minimize frictional pressure losses and may prevent irreversible shear degradation of the gel, such as when Zr or Ti crosslinking agents are used. Delayed crosslinking may be time, temperature or both time and temperature controlled as appropriate, depending on the specifics of the particular fracturing process.

When incorporated, the polymer-based viscosifier may have any suitable viscosity. The minimum viscosity may be that which is suitable to carry proppant within the fracturing environment. In certain embodiments, the viscosity may be from about 50 mPa-s or greater at a shear rate of about 100 $sec^{-1}$ at treatment temperature, more particularly about 75 mPa-s or greater at a shear rate of about 100 $sec^{-1}$, and even more particularly about 100 mPa-s or greater. Generally, the maximum viscosity is less than about 1,000 mPa-s, more typically, less than about 600 mPa-s at a shear rate of about 100 $sec^{-1}$. Higher viscosities are generally avoided to minimize cost and promote better clean-up of the fracturing fluid after the fracture has closed and the well is in the production phase.

The following example is included to demonstrate preferred embodiments of the inventions. It should be appreciated by those of skill in the art that the techniques disclosed in the example which represents techniques discovered by the inventors to function well in the practice of the inventions, and thus can be considered to constitute preferred modes for its practice. However, those of skill in the art should, in light of the present disclosure, appreciate that many changes can be made in the specific embodiments which are disclosed and still obtain a like or similar result without departing from the scope of the inventions.

EXAMPLES

Example 1

Solid Peroxide Polymer Breaker Comparison

Experiments were performed to determine the polymer breaking efficiency and subsequent viscosity reduction of viscous crosslinked fluids containing the non-oxidizer class calcium peroxide particles of the present disclosure. The viscous fluids were prepared by mixing 250 mL of Houston, Tex. tap water and 2.5 mL of guar slurry containing 40 lb/1,000 gal of guar (GLFC-5, available from Baker Hughes, Houston, Tex.) for 3 minutes in a Waring blender. Subsequently, 0.25 mL (1 gal/1,000 gal) of clay stabilizer, 0.5 mL (2 gal/1,000 gal) of potassium hydroxide (KOH), 0.0125 g (0.05 lb/1,000 gal) of non-oxidizer class calcium peroxide powder containing various diluents (Table A) or 0.0625 g (0.25 lb/1,000 gal) of non-oxidizer class magnesium peroxide powder (IXPER® 35M, available from Solvay Chemicals, Inc., Houston, Tex.) were then added. This was followed with TBC-X315 boron-containing crosslinking additive (available from TBC-Brinadd, LLC, Houston, Tex.) at a concentration of 0.5 mL (2 gal/1,000 gal) and mixed for 30 seconds. The initial viscosities and viscosity reductions with time of the crosslinked fluids were conducted on a Grace M5600 rheometer (available from Grace Instrument Company, Houston, Tex.) for 2 hr:10 min, at a temperature of 255° F., and 400 psi of pressure. The results of these comparisons are shown in Tables C and D.

TABLE A

Diluents for Non-Oxidizer Class Calcium Peroxide Samples.

| Sample | Name | Formula |
|---|---|---|
| 1 | Aluminum Hydroxide | $Al(OH)_3 \cdot nH_2O$ |
| 2 | Magnesium Hydroxide | $Mg(OH)_2$ |
| 3 | Magnesium Carbonate Hydroxide Hydrate | $C_4Mg_4O_{12} \cdot H_2MgO_2 \cdot nH_2O$ |
| 4 | Zeolite 13X | $Na_2O \cdot Al_2O_3 \cdot 2.5SiO_2 \cdot nH_2O$ |

TABLE B

Burn Times and Regulated Class of Goods.

| | Dilution Substance | 75 C[1] (wt. %) | $CaO_2$ (wt. %) | $t_{0.1}$[2] (sec.) | Class[3] TDG |
|---|---|---|---|---|---|
| Substance Sample | $Ca(OH)_2$ Technical pure | 24 | 18 | 129 | Not 5.1 |
| Substance Supplier | Zeolite 13X (powder) Süd-Chemie | 40 | 30 | >180 | Not 5.1 |
| Substance Supplier | $Mg(OH)_2$ Sigma-Aldrich | 40 | 29.6 | 139 | Not 5.1 |
| Substance Supplier | Magnesium carbonate monohydrate Aldrich | 50 | 37.5 | >180 | Not 5.1 |
| Substance Supplier | $Al(OH)_3$ MERCK | 50 | 37.5 | >180 | Not 5.1 |

[1] Refers to IXPER® 75 C, available from Solvay Chemicals.
[2] Refers to decomposition or combustion/burn time.
[3] TDG refers to the Transportation of Dangerous Goods regulated classes of goods, as set forth in the United Nations Recommendations on the Transportation of Dangerous Goods, 29 C.F.R, and 40 C.F.R.; Class 5.1 is the class for "oxidizing substances."

Within the frame of the invention, and as shown in Table B, the addition of other constituents to the $CaO_2$ particles are in an amount and nature sufficient to generate water in an amount and in a temperature range appropriate to impact the speed of combustion, and/or to absorb at least partially the decomposition heat of the $CaO_2$. In accordance with aspects of the present disclosure, this means that the amount of water generated during the above-referenced UN Manual test is enough to bring the burning time according to the test above 120 seconds. For weak oxidizers (classified as 5.1 PGIII), the burning time is between 120 and 50 seconds, for medium oxidizers (classified as 5.1 PGII), it is between 50 and 10 seconds, and it is less than 10 seconds for strong oxidizers (classified as 5.1 PGI). According to the same classification, particles with a burning time above 120 seconds are classified as non-oxidizers under the UN Standards. Table B above exhibits the results of the standard burn test UN Manual 0.1 as applied to some commercial grades of IXPER® peroxides, as diluted with another component.

Preparation of TBC-X315 Borate Crosslinking Suspension. TBC-X315 was prepared by combining 249.29 mL of LVT-200 (available from Calumet Specialty Partners, L.P., Indianapolis, Ind.), 9.5 g of Claytone IMG-400 (available from Southern Clay Products, Gonzales, Tex.), 1.0 mL of a polar activator (Jeffsol PC, available from Huntsman Petrochemical Corp., The Woodlands, Tex.), 4.0 mL of CST-7605D surfactant (available from Conlen Surfactant Technology, Conroe, Tex.), 175 g of ulexite (available from American Borate Company, Virginia Beach, Va.) and 2.5 g of ETIDOT-67® (available from American Borate Company, Virginia Beach, Va.).

The results of Example 1 illustrate the ability of the compositions described herein to produce substantial reductions in the viscosity of well treatment fluids treated with solid inorganic peroxide polymer breakers. The minimum after peak viscosities and the percentage reduction of viscosities in Table C and D show that compositions containing non-oxidizer class calcium peroxide will decrease the values of the viscous crosslinked fluids from 98.1%-99.6% as compared to 99.6% for a non-oxidizer class magnesium peroxide. The performance profile of the non-oxidizer class calcium peroxide with an 80% less concentration is equal to the non-oxidizer class magnesium peroxide. The results of these comparisons, over a 2 hr:10 min test time are shown graphically in FIG. 1.

TABLE C

Viscosity Comparison.

Viscosity @ 100 sec$^{-1}$, cP

| Value | Blank[1] | IXPER® 35M[2] | Sample 1[3] | Sample 2[4] | Sample 3[5] | Sample 4[6] |
|---|---|---|---|---|---|---|
| Average | 1,306 | 467 | 250 | 409 | 463 | 414 |
| Max./Peak | 2,218 | 2,286 | 1,654 | 1,528 | 1,623 | 1,769 |
| Min. After Peak | 921 | 0.1 | 4 | 18 | 11 | 8 |

[1] Prepared as per Example 1, containing no solid inorganic peroxide.
[2] Prepared as per Example 1, containing 0.25 lb/1,000 gal of magnesium peroxide.
[3] Prepared as per Example 1, containing 0.05 lb/1,000 gal of calcium peroxide with aluminum hydroxide.
[4] Prepared as per Example 1, containing 0.05 lb/1,000 gal of calcium peroxide with magnesium hydroxide.
[5] Prepared as per Example 1, containing 0.05 lb/1,000 gal of calcium peroxide with magnesium carbonate hydroxide hydrate.
[6] Prepared as per Example 1, containing 0.05 lb/1,000 gal of calcium peroxide with zeolite 13X.

TABLE D

Viscosity Reduction with Non-Oxidizer Class Peroxides.

Percent Change[1]

| Value | IXPER® 35M[2] | Sample 1[3] | Sample 2[4] | Sample 3[5] | Sample 4[6] |
|---|---|---|---|---|---|
| Average | −64.2 | −80.9 | −68.7 | −64.5 | −68.3 |
| Max./Peak | 3.1 | −25.4 | −31.1 | −26.8 | −20.2 |
| Min. After Peak | −99.9 | −99.6 | −98.1 | −98.8 | −99.1 |

[1] Percent change in viscosity, relative to the blank in Table C.
[2] Prepared as per Example 1, containing 0.25 lb/1,000 gal of magnesium peroxide.
[3] Prepared as per Example 1, containing 0.05 lb/1,000 gal of calcium peroxide with aluminum hydroxide.
[4] Prepared as per Example 1, containing 0.05 lb/1,000 gal of calcium peroxide with magnesium hydroxide.
[5] Prepared as per Example 1, containing 0.05 lb/1,000 gal of calcium peroxide with magnesium carbonate hydroxide hydrate.
[6] Prepared as per Example 1, containing 0.05 lb/1,000 gal of calcium peroxide with zeolite 13X.

Other and further embodiments utilizing one or more aspects of the inventions described above can be devised without departing from the spirit of Applicants' invention. For example, combinations of elements, such as the peroxide breaker described above and another breaker may be used in the compositions and methods. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope, range or equivalent of the following claims.

What is claimed is:

1. A method of treating a subterranean zone penetrated by a well bore comprising the steps of:
   providing inorganic peroxide particles comprising calcium peroxide ($CaO_2$) and at least one diluent selected from the group consisting of zeolite, magnesium hydroxide, magnesium carbonate, and aluminum hydroxide, wherein the inorganic peroxide particles have an available oxygen content (AvOx) of less than 11.0% by weight;
   preparing or providing a viscous crosslinked aqueous treating fluid by mixing the inorganic peroxide particles with water, a gelling agent, and a crosslinking agent;
   introducing the viscous crosslinked aqueous treating fluid into the subterranean zone; and
   allowing the viscous crosslinked aqueous treating fluid to break into a low viscosity fluid.

2. The method of claim 1 wherein the water in the treating fluid is selected from the group consisting of fresh water, brine, and salt water.

3. The method of claim 1 wherein the gelling agent is present in the treating fluid in an amount in the range of from about 0.25% to about 1.5% by weight of water therein.

4. The method of claim 1 wherein the inorganic peroxide particles have an available oxygen content (AvOx) of at least 4.0%.

5. The method of claim 1 wherein the crosslinking agent and breaking agent in combination are present in the treating fluid in an amount in the range of from about 0.1% to about 1.5% by weight of the water therein.

6. The method of claim 1, wherein the inorganic peroxide particles have an available oxygen content (AvOx) of less than 10.5% by weight.

7. The method of claim 1, wherein the inorganic peroxide particles have an available oxygen content (AvOx) of less than 10.0% by weight.

* * * * *